United States Patent [19]
Mann

[11] Patent Number: 5,408,642
[45] Date of Patent: Apr. 18, 1995

[54] METHOD FOR RECOVERY OF A COMPUTER PROGRAM INFECTED BY A COMPUTER VIRUS

[75] Inventor: Omri Mann, Jerusalem, Israel

[73] Assignee: Symantec Corporation, Cupertino, Calif.

[21] Appl. No.: 705,390

[22] Filed: May 24, 1991

[51] Int. Cl.$^6$ .................... G06F 11/08; G06F 12/16; G06K 9/03

[52] U.S. Cl. ........................... 395/575; 371/30; 371/67.1

[58] Field of Search ............... 371/19, 67.1, 30; 395/575; 380/4

[56] References Cited
U.S. PATENT DOCUMENTS

5,050,212  9/1991  Dyson ........................... 380/4 X

*Primary Examiner*—Stephen M. Baker
*Attorney, Agent, or Firm*—Ladas & Parry

[57] ABSTRACT

A recovery technique allows a computer program to be recovered from a program which has been infected with a computer virus. Prior to the program being infected, a unique fingerprint of the program is taken and stored along with data relating to the beginning portion of the program at a location separate from the program. A program thought to be infected is processed by generating a fingerprint of a string in the program utilizing the stored data. The fingerprint that is generated is compared with the stored fingerprint to determine whether or not the two fingerprints match. If the fingerprints match, the program is restored from the stored information and the string. If the fingerprints do not match, the value utilized to select the string can be incremented and the process repeated.

21 Claims, 7 Drawing Sheets

START ADDRESS

16X FIX UP SHIFT

METHOD FOR RECOVERY OF A COMPUTER PROGRAM INFECTED BY A COMPUTER VIRUS

BACKGROUND OF THE INVENTION

Computer viruses burst onto the scene a few years ago and quickly became a major threat to the reliability of computer programs. A "computer virus" is so named because it is a piece of self-replicating code that attaches itself to a computer program. The code utilizes the computer program as a means for "infecting" another computer program by attaching a replica of itself to that program. The computer virus normally attaches itself to the permanent copy of the program, such as found on a hard disk, so that the virus is not lost once the power is turned off.

Computer viruses as a prank can be harmless except for the fact that they utilize valuable memory space. However, the prank can turn into vandalism if the computer virus intentionally or unintentionally damages the program. Computer virus "time bombs" can lay dormant within the memory of the computer until a certain event, such as a particular date and time occurs, and then spring into action, creating havoc within the computer system.

Various methods of the detecting computer viruses are known in the art. The typical computer virus detection program involves a compilation of the known viruses that infects computers and a program that searches for these viruses based upon their known means of infection. Another technique is utilized in a program known as V ANALYST II sold by BRM Technologies, Ltd. in which a "fingerprint" of a program is taken prior to infection and stored at a remote location. Alterations in the fingerprint taken at a later time are indicative of infection of the program.

Restoration of a computer program after it has been infected by a computer virus can be effected by copying a clean copy of the program from a backup file. However, in large computer systems, such as shared networks, this can be a time consuming process. In view of the large number of users of such systems, these systems are more vulnerable to a computer virus entering the system through one of the many users which further exacerbates the problem. In addition, where computer programs are constantly being changed in such a system, it is necessary to make frequent backup copies which result in the storage of enormous amounts of information. Accordingly, there is a need for a simple and rapid means to restore a computer program which has been infected with a computer virus.

SUMMARY OF THE INVENTION

It is a general object of the present invention to provide a method restoring a computer program infected by a computer virus.

Another object of the present invention is a method to restore a computer program infected by computer virus which has a high probability of obtaining the original program from the infected program.

Yet another object of the present invention is a method of restoring a computer program infected by a computer virus in which a minimal amount of information must be stored for each program.

A further object of the present invention is a method for restoring a computer program infected by a computer virus which can be performed quickly.

A still further object of the present invention is a method of restoring a computer program infected with a computer virus which does not require a table of known viruses in order to reconstruct the program.

Yet another object of the present invention is a method of restoring the computer program infected with the computer virus which is unknown.

These and other objects and advantages of the present invention are provided in accordance with one aspect of the invention by a method of restoring a computer program infected by a computer virus by generating a unique fingerprint for a computer program prior to said program being infected. The unique fingerprint is stored at a separate location prior to the program being infected along with data relating to a beginning portion of the program. A fingerprint of a string in the program which is thought to be infected is generated utilizing the stored data. The generated fingerprint is compared with the stored fingerprint. It is determined that the program can be restored if the fingerprints match. The program is restored from the string and the stored data if the comparison determines that restoration is possible.

Another aspect of the present invention includes a method of restoring a computer program infected by a computer virus by generating a unique fingerprint for a computer program prior to the program being infected. The unique fingerprint, data relating to a beginning portion of the program and a length of the program is stored at a separate location prior to said program being infected. A starting location in the program is selected having an address which exceeds a length of the stored beginning portion by a predetermined number. A fingerprint of a continuous string in the program, having a length equal to the stored program length, is generated utilizing the stored data relating to the beginning portion. The fingerprint generated is compared with the stored fingerprint and a determination that the program can be restored is made if the fingerprints match. The program is restored from the string and the stored data if said comparison determines that restoration is possible.

A further aspect of the invention comprises a method of restoring a computer program infected by a computer virus by generating a unique fingerprint for a computer program prior to the program being infected. The unique fingerprint, and a length of the program is stored at a separate location prior to the program being infected. A fingerprint of a string formed of first and second sub-strings is generated where the first sub-string has starting point which is after an ending point of the program and a predetermined length. The second sub-string has a starting point offset from a beginning of the program by the predetermined length. The combined lengths of the first and second sub-strings is equal to the stored program length. The fingerprint generated is compared with the stored fingerprint and determination that the program can be restored is made if the fingerprints match. The program is restored said program from the string and the stored data if the comparison determines that restoration is possible.

A further object of the invention includes a method of restoring a computer program having fixup tables and being infected by a computer virus by generating a unique fingerprint for a computer program prior to the program being infected. The unique fingerprint, data relating to a beginning portion of the program and a length of the program is stored at a separate location prior to the program being infected. A length of the virus is determined. An integer fixup shift equal to the virus length divided by 16 is determined. A modified fixup table having a segment portion of each address reduced by the fixup shift is generated. A fingerprint is generated for a concatenation of the stored beginning portion, the modified fixup table and a continuous string having a starting point equal to 16 times the fixup shift bytes after an end of the fixup table and having a length of the stored length minus a length of the fixup table and minus the stored length of the beginning portion. The fingerprint generated is compared with the fingerprint stored and a determination that the program can be restored is made if the fingerprints match. The program is restored from the string and the stored data if said comparison determines that restoration is possible.

BRIEF DESCRIPTION OF THE DRAWINGS

FIGS. 1A–1C illustrate infection of a program by one type of computer virus which attaches itself to the beginning and/or the end of the program, FIG. 1A shows the uninfected program, FIG. 1B shows the infected program and FIG. 1C illustrates the technique in restoring the program;

FIGS. 2A–2C illustrate an infection of the computer program by another type of computer virus which attaches itself to the front of the program and moves that portion of the program which is displaced to the end of the program, FIG. 2A illustrates the uninfected program, FIG. 2B illustrates the infected program and FIG. 2C illustrates the technique in restoring the program;

FIGS. 3A–3C illustrate infection of a computer program having fixup tables, FIG. 3A illustrates the uninfected program, FIG. 3B illustrates the infected program and FIG. 3C illustrates the technique utilized in restoring the program;

DETAILED DESCRIPTION

Figure 1A:
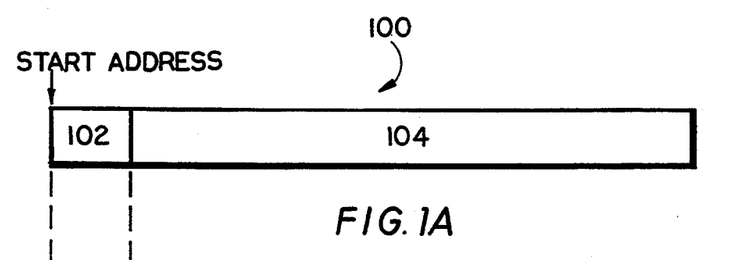
Figure 1B:
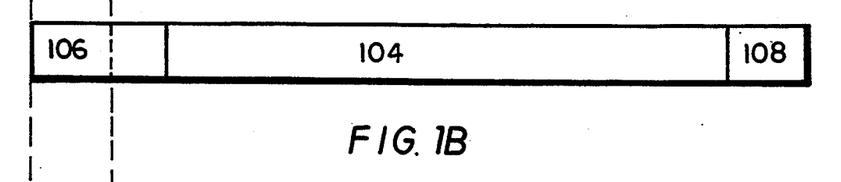

Computer viruses infect computer programs in various ways. FIG. 1A shows a diagram of a computer program having a series of instructions and generally shown as 100. The program may comprise a "header" which, as well known to those skilled in the art, contains specified information regarding the program such as the entry point of the program, the initial stack location and the load image size which is typically 28 bytes in length. The program also comprises the computer code 104 which is generally very much larger than the header and is usually in the range of a few kilobytes to hundreds of kilobytes. FIG. 1B shows the program 100 infected by a computer virus 106. The virus can be any length depending upon the function the virus is to perform, although it is typical for a virus to be several kilobytes in length. The virus 106 has attached itself to the beginning portion of the program and may also add a portion of code 108 to the end of the program. This is particularly useful in showing the virus that this file has been infected so that file is not infected a second time. This is important because the virus necessarily extends the length of the file because the virus is longer than the header. If the virus were to reinfect the file again, the file would grow longer and longer and would be finally be unexecutable, thus giving away the virus' presence. The goal of the virus is to remain in the permanently stored copy of the file, typically on a hard disk. Then, each time the file is executed, the virus can be activated to infect another file.

In the infected file 100 shown in FIG. 1B, the virus has placed itself at the beginning of the program. There are several way in which this can occur. The virus attached at 106 can move the remainder of the program down in the file on the disk. Alternatively, only a small portion of the virus can be placed at 106 with the major portion of the virus being placed at the end 108 of the program. The instructions in 102 overwritten by the virus would typically be stored with 108. Once the program is activated in the computer's memory, the virus will take control and perform its replication function in one or more other programs stored on the disk before passing control to the program so that the program can be executed. By having the program execute in its normal manner, the presence of the virus is hidden, which allows the virus to infect all files within the system.

In order to be able to restore the program 100, it is necessary to store certain information regarding the program in advance of the program being infected by the virus. This information comprises a "fingerprint" of the program and may also include information such as the length of the program. The "fingerprint" is a unique signature which will identify the program. Typically this would be an error checking code, such a cyclic redundancy check, which codes are well known to those skilled in the art and need not be discussed in detail here. As is well known to those skilled in the art, the greater the number of bits in the error checking code, the lower the probability is of an error. Thus, there is a tradeoff between increasing the number of bits which lowers the probability of an error and increases the amount of time required to process the error checking code and the amount of information which must be stored for each program. The information stored in advance also includes information regarding the beginning portion of the program, such as the header. Although it is not required to store all of this information, typically a beginning portion comprising about 40 bytes of information is stored for each program. For safety, this information is stored at a location other than that of the original program.

Figure 7:
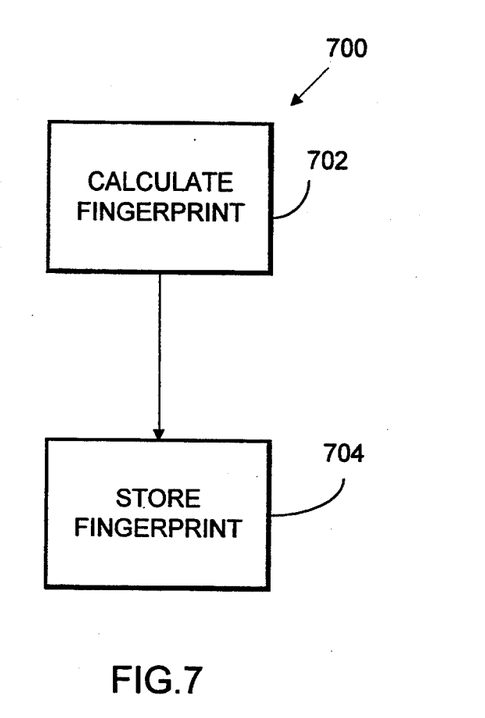
FIG. 7 is a flow diagram illustrating the fingerprint process.

Referring to FIG. 7, a flow diagram of the event sequences in producing the stored information is generally shown as 700. In block 702 the "fingerprint" of the program is generated using an error detecting code such as a cyclic redundancy check. Other techniques such as a checksum or an exclusive - OR of words in the program can also be utilized as can other techniques which produce a unique signature for each program. This information is transferred to block 704 at which, the information is stored at a remote location with other information relating to the files such as the header of the program and the program length. This program is repeated for each program for which the recovery ability is desired prior to the program being infected by a virus.

Figure 1C:
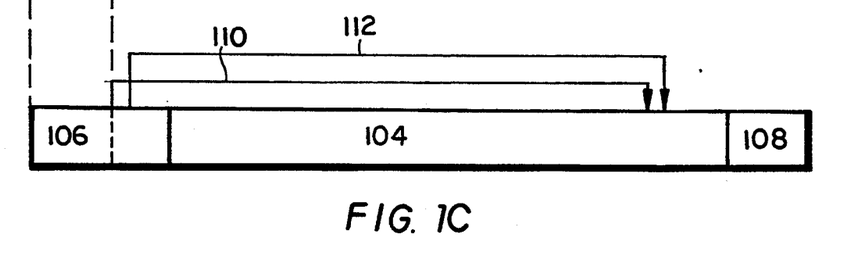
Figure 4:
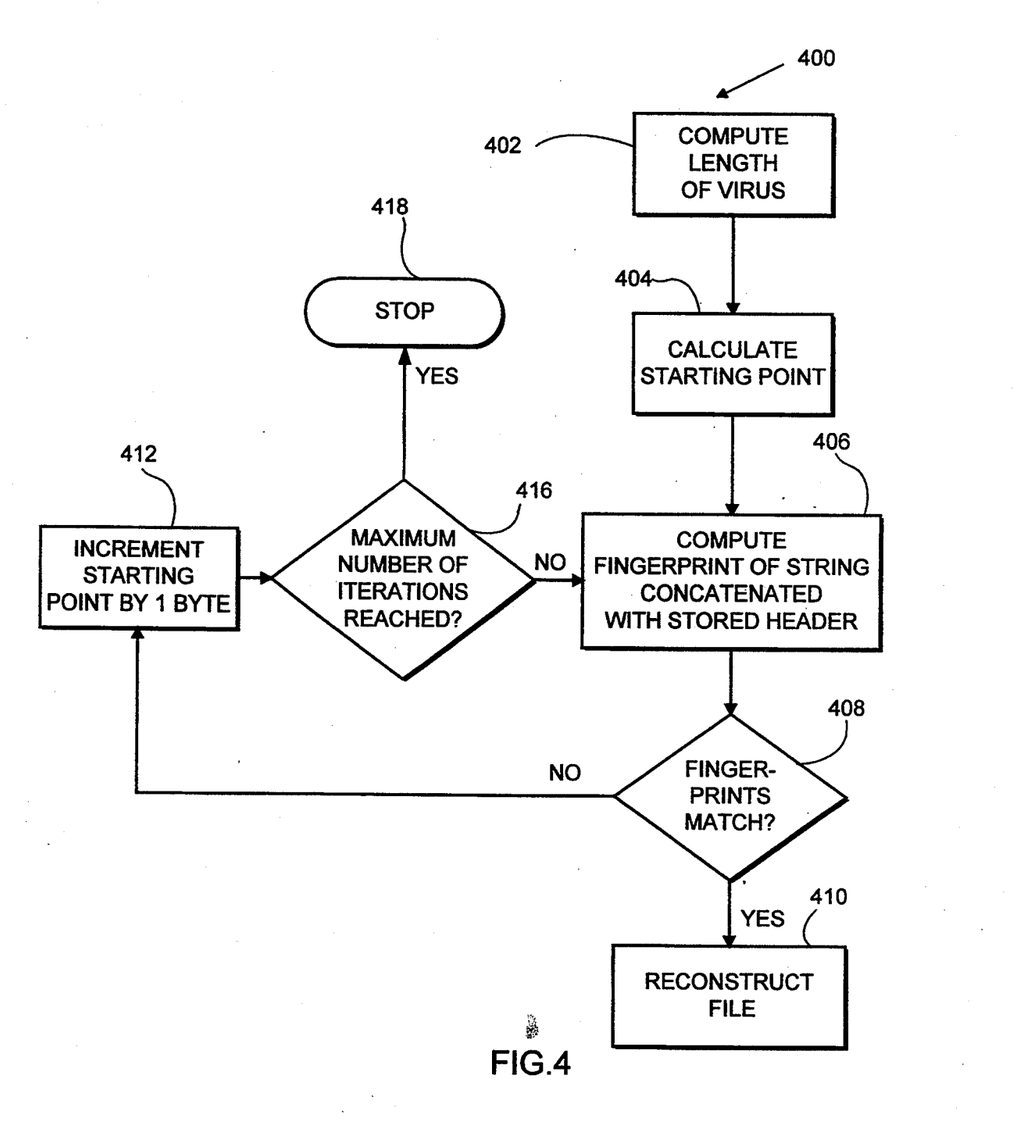
FIG. 4 is a flow diagram of the event sequences of the technique illustrated in FIG. 1C.

Referring now to FIGS. 1C and 4, a series of events will now be described in which the program 100 is restored, if possible. It is not always possible to restore a program that has been infected by a virus because the virus may intentionally or unintentionally damage the program, such as erasing or overriding a portion of the program. In such cases, recovery of the program is only possible if backup copies are available.

Referring FIGS. 1C and 4, which illustrates a technique for restoring a program infected as shown in FIG. 1B, a flow diagram of the events of this process is generally shown as 400. The process starts at block 402 in which the length of the virus is computed. The length of the virus is determined to be the difference between the length of infected program and the length of the original program, which information was stored at the remote location. The length of the virus is taken as the maximum number of iterations through the technique that is necessary in order to restore the program. If restoration is not possible after this number of iterations, it is assumed that the program can not be restored by this technique.

The process then proceeds to block 404 in which the starting point of the fingerprint is calculated. As shown in FIG. 1C, the process assumes that the starting point of the program is the same as it was before the header 102 was replaced with the virus 106. In general, the virus 106 is longer than the header 102 and this will no longer be the case. However, it is possible. The starting point is computed by taking the starting point of the infected program and adding the saved header size to generate the first address at which the program 102 is assumed to start. This information is input to block 406 in which the fingerprint of the program is computed. The program code 104 has the same length after infection by the virus as it did prior to the infection by the virus. Block 406 takes a string having the computed starting address and having the length of the program code 104, which information was stored at the remote location. The length of the string is the size of the clean program less the size of the header. This is shown diagrammatically by arrow 110 in FIG. 1C. Block 406 then computes the fingerprint for the stored header concatenated with this string. The same technique is utilized to generate the fingerprint as was utilized to generate the fingerprint prior to infection. These techniques can be error checking codes such as cyclic redundancy checks, checksums or an exclusive - OR of words in the program, for example.

The fingerprint is then passed to block 408 in which is it is compared with the fingerprint that was prepared and stored prior to infection. If there is a match between the fingerprint that was just generated and the stored fingerprint, then the process proceeds to block 410. If there is no match between the fingerprint generated and the stored fingerprint, the process proceeds to block 412.

In block 412, the starting point for the string shown diagrammatically by arrow 110 in FIG. 1C is incremented by 1 byte and a counter is incremented by 1. The new starting point and counter value are passed to block 416.

In block 416 the counter is checked to see if it is greater than the computed size of the virus. If it does equal the computed size of the virus, this is the maximum number of iterations that the process should utilize to try to restore the program. The process thus concludes that restoration is not possible using this technique and control passes to block 418 in which operation is stopped. The user may be notified at this point that restoration is not possible or other restoration techniques, as described below, can be utilized to try to restore the program. If the counter does not exceed the size of the virus, control is passed back to block 406.

At block 406, the fingerprint is generated utilizing a string having a new starting point but having the same length as the first try. This is indicated diagrammatically in FIG. 1C by arrow 112. The process is continued until it terminates in block 418 or block 410.

In block 410, the program is reconstructed utilizing the string which has a fingerprint that matches the originally stored fingerprint. The program is reconstructed by adding the original header to the string and deleting all other parts of the infected program.

Figure 2A:
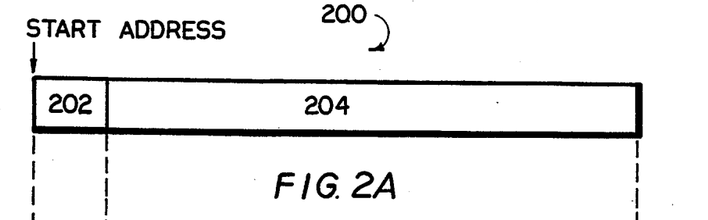
Figure 2B:
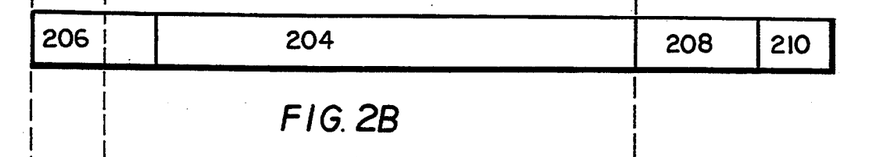
Figure 2C:
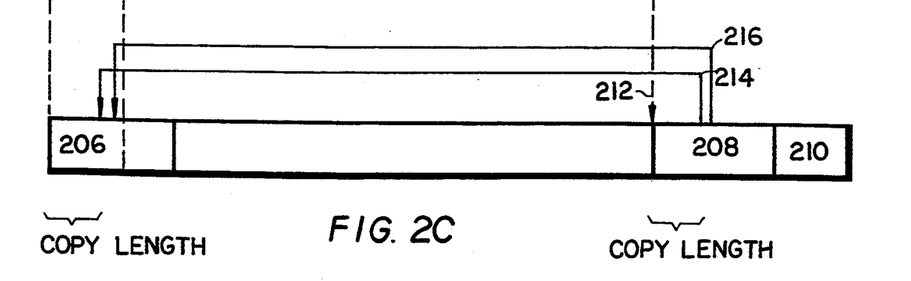
Figure 5:
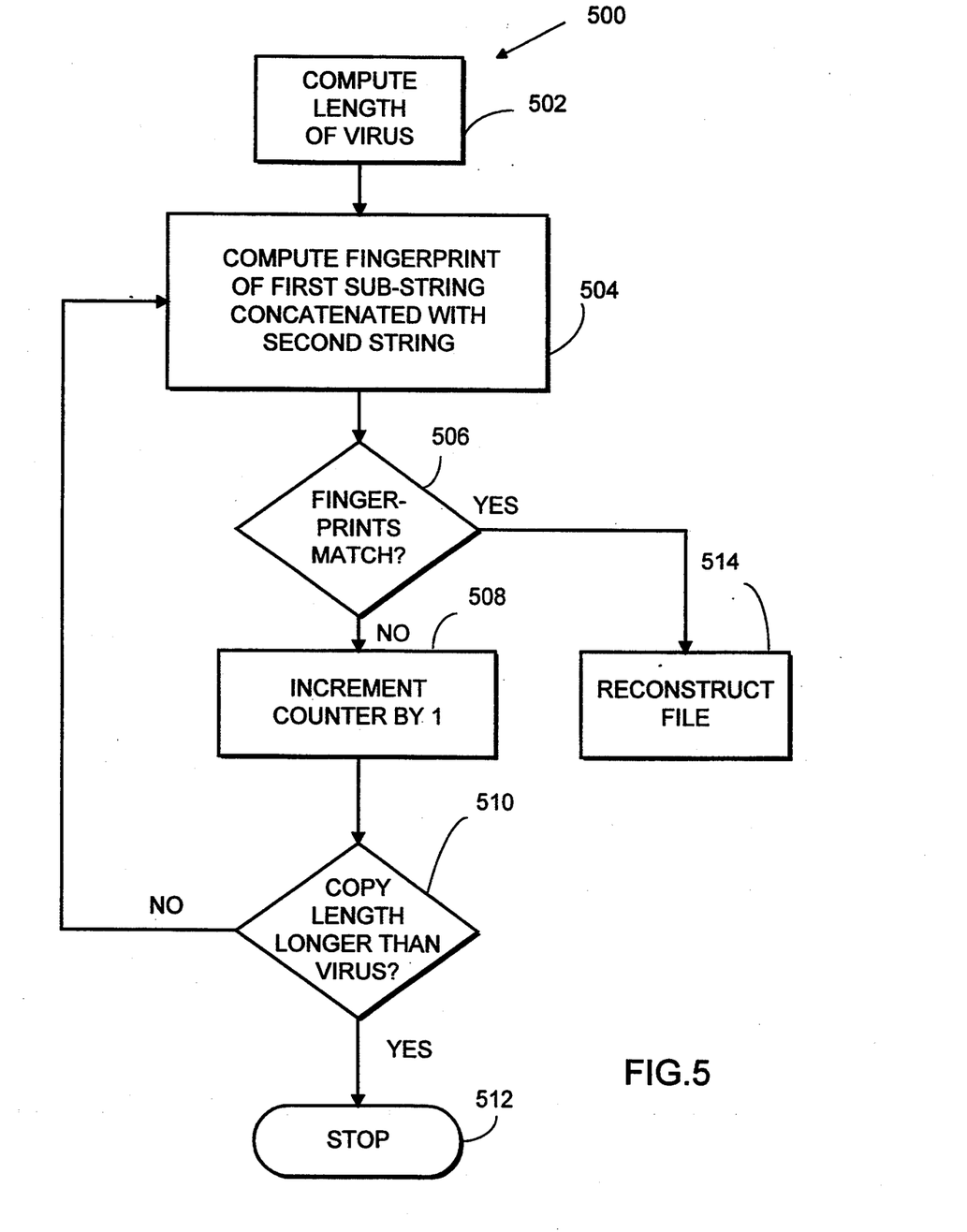
FIG. 5 is a flow diagram of the event sequences of the technique illustrated in FIG. 2C.

FIG. 2 illustrates a second common type of computer virus infection. A computer program generally shown as 200 in FIG. 2A has a header 202 and program code 204. FIG. 2B illustrates infection of this program with a virus in which the virus 206 has displaced code at the beginning of the program. In this case, the instructions which have been displaced by the virus 206 are rewritten at location 208 at the end of the program. The virus may also place additional codes at the end of the program, as illustrated by reference numeral 210. In this mode of infection, when the program is executed, the virus performs its infection and infects one or more additional files in the computer. Once the task is complete, the virus overwrites itself with the program code stored at 208 and jumps to the original starting point of the program. The program code 204 then executes as it would normally, thus making the presence of the virus transparent to the user of the computer. Thus the virus is free to replicate itself without detection. The disk file containing the virus remains unchanged. Referring specifically to FIGS. 2C and FIG. 5, a technique for restoring a program infected in this manner will be described. It should be understood that the fingerprinting process described above which is performed prior to infection must have been performed for this method to perform the restoration function. However, this technique can follow the technique illustrated in FIGS. 1C and 4 utilizing the same information utilized by that technique. That is, only a single fingerprinting prior to infection is needed for both techniques and the technique described below in connection with FIGS. 3 and 6 to be performed. Referring specifically to FIG. 5, a flow diagram of the events of this technique is illustrated generally as 500. The process starts in block 502 at which the length of the virus, as described above, is computed. A counter, which is designated as the "copy length" is set at a value of 1. The process then proceeds to block 504.

In block 504, the program is assumed to start at the end of code 204 at point 212 in FIG. 2C. A first substring starting at point 212 is chosen having a length which is equal to the copy length described above. A second string is chosen having a starting point which is displaced from the starting address of the program shown in FIG. 2B and 2C by the copy length as illustrated by arrow 214 and proceeding until the end of the original program 204.

The fingerprint of a concatenation of the two substrings is then generated. Control passes to block 506.

In block 506, the fingerprint is compared with the originally stored fingerprint. If the fingerprints match, control is passed to block 514 in which the program is restored. If the fingerprints do not match, control is passed to block 508.

In block 508, the counter set to the copy length is incremented by 1. Control passes to decision block 510.

In decision block 510, the copy length is compared to see if it is longer than the virus length. If it is, then control passes to block 512 at which it is determined that the program is not recoverable by this technique. If the copy length does not exceed the virus length, control passes back to block 504.

In block 504, two new sub-strings are selected. The first sub-string has a starting point at point 212 in FIG. 2C and a copy length which is 1 byte longer than the copy length illustrated in FIG. 2C. The second sub-string starts at a location 1 byte further from the starting address of the program and continues until the end of file 204, as illustrated by arrow 216. The process is repeated for a maximum number of iterations equal to the virus length at which point it will either be stopped at block 512 or have reached reconstruction at block 514.

Reconstruction at block 514 is similar to the reconstruction described in connection with the embodiments of FIG. 4 and FIG. 1C. The reconstructed program consists of a concatenation of the two sub-strings. All other program code is deleted.

Figure 3A:
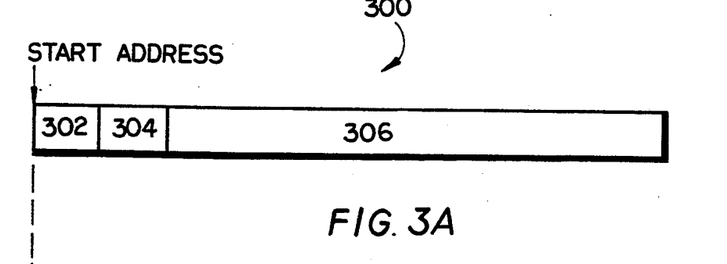

A third type of computer infection occurs in files having fixup tables following the header. These type of files are commonly found in .EXE files in MS-DOS (trademark of Microsoft Corp.) operating systems. Referring to FIG. 3A a program of this type is generally shown as 300. The program consists of a header 302 followed by a fixup table 304 followed by the program code 306. The purpose of the fixup table, as is well known to those skilled in the art, is the result of the addressing scheme chosen for the type of processor utilized in these operating systems. The processor is a 16 bit microprocessor and the address scheme requires a 20 bit address. As a result, the memory is broken up into a plurality of 64 kilobyte segments and the address comprises a segment number plus an offset number. Both the segment and offset numbers are 16 bit numbers. However, the segment number is multiplied by 16 which produces a 20 bit address, which when added to the 16 bit offset number also results in a 20 bit address. Overflow of the 20 bit address is the responsibility of the computer programmer.

In programs which exceed 64 kilobytes in length, the addresses referred to in the program are relative addresses. When the program is loaded into memory by the operating system, the operating system has to correct these addresses in order to produce an absolute address for the jump, call and other instructions. The fixup table contains a list of pointers to addresses which contain the relative addresses. When the file is loaded into memory, the operating system goes to each of the addresses having a pointer and adds the absolute address of the beginning instruction of the program to the relative address in the program in order to obtain the absolute address of the jump instruction. The addressing technique is well known to those skilled in the art.

Figure 3B:
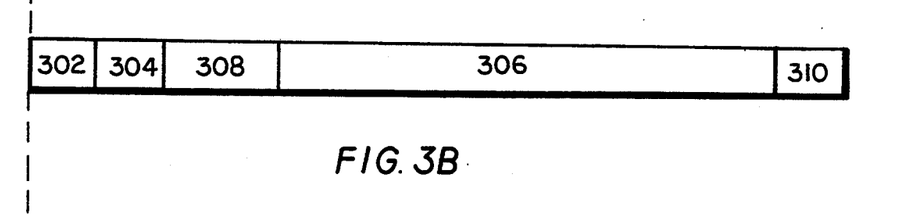

FIG. 3B shows a program of this type which has been infected with a virus. The header 302 and fixup table 304 are unaffected. The virus 308 is inserted after the fixup table 304 and before the program code 306. A portion of virus may also be added at the end of the program code shown as 310.

In inserting itself between the fixup table 304 and the program code 306, the virus 308 must then change the fixup table to point to the new addresses of the jump instructions. The addresses of the jump instructions are necessarily moved by the length of the virus 308. Thus, it is necessary to add the length of the virus 308 to each of the pointers found in fixup table 304.

Figure 3C:
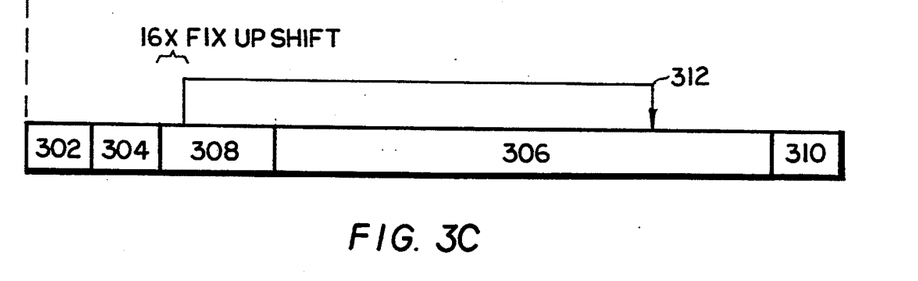
Figure 6:
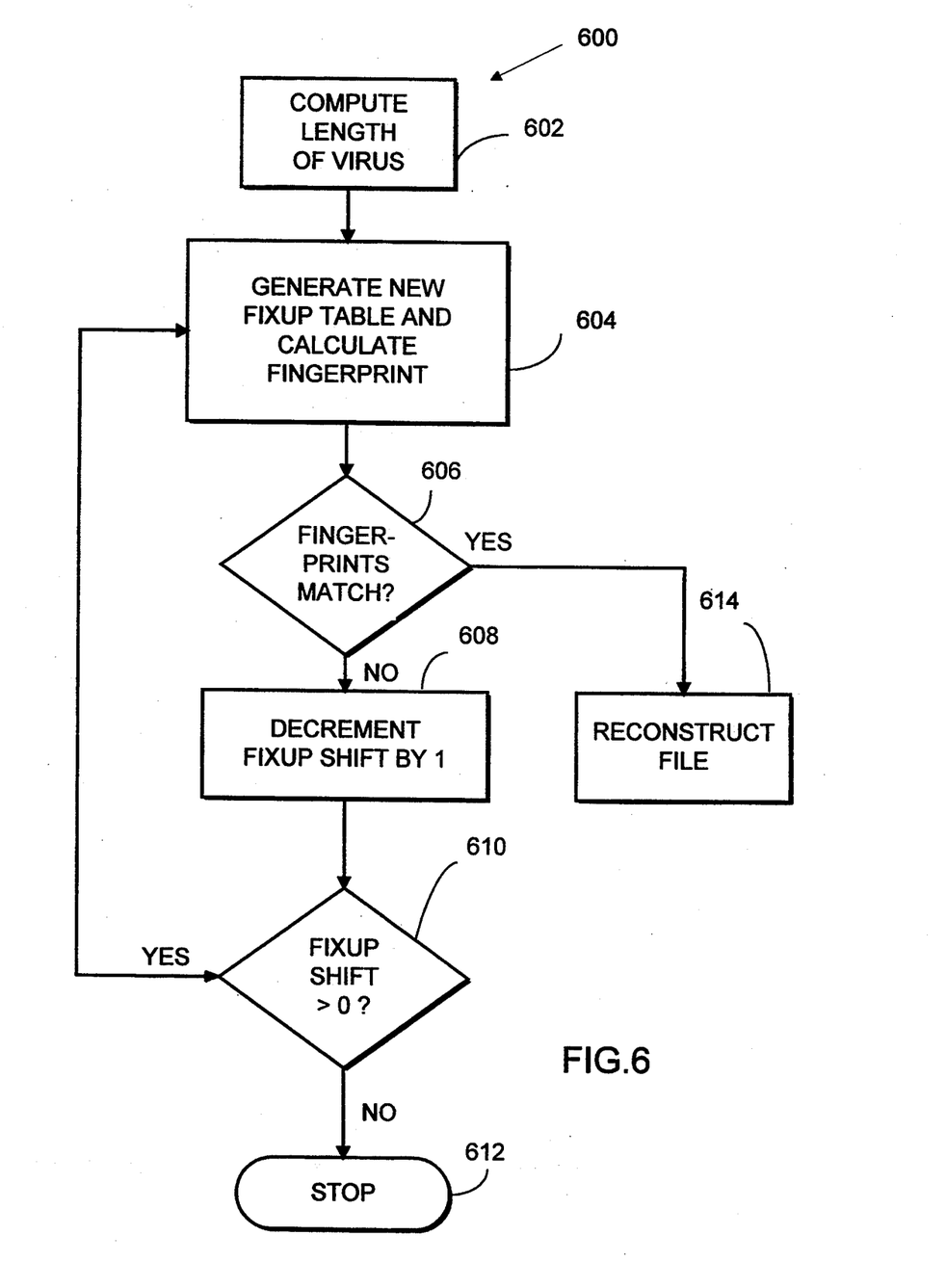
FIG. 6 is a flow diagram of the event sequences of the technique illustrated in FIG. 3C.

Referring to FIG. 3C and FIG. 6, a technique for restoring the program 300 infected by a virus 308 is illustrated generally as 600 in FIG. 6. It is assumed that the fingerprint process has been performed prior to infection of the program, as described above. As stated earlier, it is unnecessary to perform this function more than once for all three recovery techniques to be utilized. The program starts in block 602 in which the virus length is computed as the difference in length between the infected and the non-infected program. Next the "maximum fixup shift" is computed as the virus length divided by 16. Only the integer value of the "maximum fixup shift" is utilized, any fractional value is discarded. Control then passes to block 604.

In block 604, a new fixup table is generated which is identical to the previous fixup table except that the segment part of each address is reduced by the fixup shift. A string is chosen starting at a point 16 times the fixup shift bytes after the end of the fixup table and having a length which is the length of the original file minus the length of the fixup table and the length of the header, which data has been stored prior to infection. This is illustrated diagrammatically in FIG. 3C by arrow 312. The fingerprint is generated on a concatenation of the original saved header, the newly generated fixup table and the string. Control then passes to decision block 606.

In decision block 606, the fingerprint is compared against the fingerprint that was stored prior to infection. If the fingerprints match, control passes to block 614 in which the program is restored. If the fingerprints do not match, control passes to block 608.

In block 608, the fixup shift is decremented by 1 from the maximum fixup shift and control passes to decision block 610.

In decision block 610, the fixup shift is compared to see if it exceeds zero. If the fixup shift does not exceed zero, then control passes to block 612 at which point the program is stopped as recovery by this technique is not possible. If the fixup shift does exceed zero, control passes back to block 604.

In block 604, a new fixup table is generated to utilizing the new fixup shift and a new string is chosen having a starting address equal to 16 times the fixup shift and the process is repeated until the program terminates at block 612 indicating that recovery is not possible by this technique or at block 614 at which the program is recovered.

In block 614, the program is recovered as a concatenation of the stored header, the newly generated fixup table and the string which corresponds to the newly generated fixup table. All other instructions are deleted.

While a particular embodiment of the present invention has been disclosed herein, certain changes and modifications will readily occur to those skilled in the art. For example, although the length of the program and of the fixup table are indicated as being stored prior to infection, this is not absolutely required. It is possible for the computer to start with a particular assumed length, such as 1, and then increment this value for each possible solution in the recovery technique. This necessarily increases the amount of time necessary to recover the program. Furthermore, the greater the number of reiterations in the recovery technique, the greater is the probability that a false match with the fingerprint will occur. This possibility can be overcome by increasing the length of the fingerprint but little savings is produced as storing the lengths does not require a large amount of memory. Furthermore, although the present invention has been described in conjunction with a program for the microprocessor of the computer system, it is obvious to those skilled in the art that dedicated hardware circuitry could be provided within the computer to perform this function. All such changes and modifications can be made without departing from the invention as defined by the appended claims.

I claim:

1. A method of restoring a computer program infected by a computer virus by removing said virus comprising:
   a) a generating a unique fingerprint for a computer program prior to said program being infected;
   b) prior to said program being infected storing said unique fingerprint and data relating to a beginning portion of said program at a separate location;
   c) utilizing said stored data for generating a fingerprint of a string in said infected program;
   d) comparing the fingerprint generated in step c) with the fingerprint stored in step b) and determining that the program can be restored if said fingerprints match;
   e) restoring said program from said string and said stored data if said comparison in step d) determines that restoration is possible.

2. The method according to claim 1 further comprising the steps of:
   f) selecting a string adjacent said string;
   g) repeating steps c), d) and e) of claim 1;
   h) repeating steps f) and g) until said program is restored or a predetermined number of strings have been tested.

3. The method according to claim 1 wherein said string is a concatenation of a plurality of sub-strings.

4. The method according to claim 1 wherein said data stored in step b) includes a length of said program and said string utilized in step c) is of said length.

5. The method according to claim 1 wherein said beginning portion of said program includes a header of the program.

6. The method according to claim 1 wherein said fingerprint comprises an error detecting code for said program.

7. The method according to claim 6 wherein said error detecting code is a cyclic redundancy check.

8. The method according to claim 6 wherein said error detecting code is a checksum.

9. The method according to claim 6 wherein said error detecting code is an exclusive - OR of words in said program.

10. A method of restoring a computer program infected by a computer virus by removing said virus comprising:
    a) generating a unique fingerprint for a computer program prior to said program being infected;
    b) storing, at a separate location, said unique fingerprint, data relating to a beginning portion of said program and a length of said program prior to said program being infected;
    c) selecting a starting location in said program having an address which exceeds a length of said stored beginning portion by a predetermined number;
    d) generating a fingerprint of a continuous string in said program, having a length equal to said stored program length, utilizing said stored data relating to said beginning portion;
    e) comparing the fingerprint generated in step c) with the fingerprint stored-in step b) and determining that the program can be restored if said fingerprints match;
    f) restoring said program from said string and said stored data if said comparison in step e) determines that restoration is possible.

11. The method according to claim 10 further comprising the steps of:
    g) incrementing the address of said starting location;
    h) repeating steps d), e) and f);
    i) repeating steps g) and h) until said program is restored or a predetermined number of increments in said address have been implemented.

12. The method according to claim 10 wherein said fingerprint comprises an error detecting code for said program.

13. The method according to claim 12 wherein said error detecting code is a cyclic redundancy check.

14. The method according to claim 12 wherein said error detecting code is a checksum.

15. The method according to claim 12 wherein said error detecting code is an exclusive - OR of words in said program.

16. A method of restoring a computer program infected by a computer virus by removing said virus comprising:
    a) generating a unique fingerprint for a computer program prior to said program being infected;
    b) storing, at a separate location, said unique fingerprint, and a length of said program prior to said program being infected;
    c) generating a fingerprint of a string formed of first and second sub-strings, said first sub-string having a starting point which is after an ending point of said program and having a predetermined length, said second sub-string having a starting point offset from a beginning of said program by said predetermined length, the combined lengths of said first and second sub-strings being equal to said stored program length, said fingerprint being generated utilizing said stored data relating to said beginning portion;
    d) comparing the fingerprint generated in step c) with the fingerprint stored in step b) and determining that the program can be restored if said fingerprints match;
    e) restoring said program from said string and said stored data if said comparison in step d) determines that restoration is possible.

17. The method according to claim 16 further comprising the steps of:
    f) incrementing said predetermined length;
    g) repeating steps c), d) and e);
    h) repeating steps f) and g) until said program is restored or a predetermined number of increments in said starting point has been implemented.

18. The method according to claim 16 wherein said fingerprint comprises an error detecting code for said program.

19. A method of restoring a computer program having fixup tables and being infected by a computer virus by removing said virus comprising:
    a) generating a unique fingerprint for a computer program prior to said program being infected;

b) storing, at a separate location, said unique fingerprint, data relating to a beginning portion, of said program and a length of said program prior to said program being infected;
c) determining a length of said virus;
d) determining an integer fixup shift equal to said virus length divided by 16;
e) generating a modified fixup table having a segment portion of each address reduced by said fixup shift;
f) generating a fingerprint of a concatenation of said stored beginning portion, said modified fixup table and a continuous string having a starting point equal to 16 times said fixup shift bytes after an end of said fixup table and having a length of said stored length minus a length of said fixup table and minus said stored length of said beginning portion;
g) comparing the fingerprint generated in step c) with the fingerprint stored in step b) and determining that the program can be restored if said fingerprints match;
h) restoring said program from said string and said stored data if said comparison in step d) determines that restoration is possible.

20. The method according to claim 19 further comprising the steps of:
    i) decrementing said integer fixup shift;
    j) repeating steps d), e), f), g) and h)
    k) repeating steps i) and j) until said program is restored or a predetermined number of decrements of said fixup shift have been implemented.

21. The method according to claim 19 wherein said fingerprint comprises an error detecting code for said program.

* * * * *